UNITED STATES PATENT OFFICE.

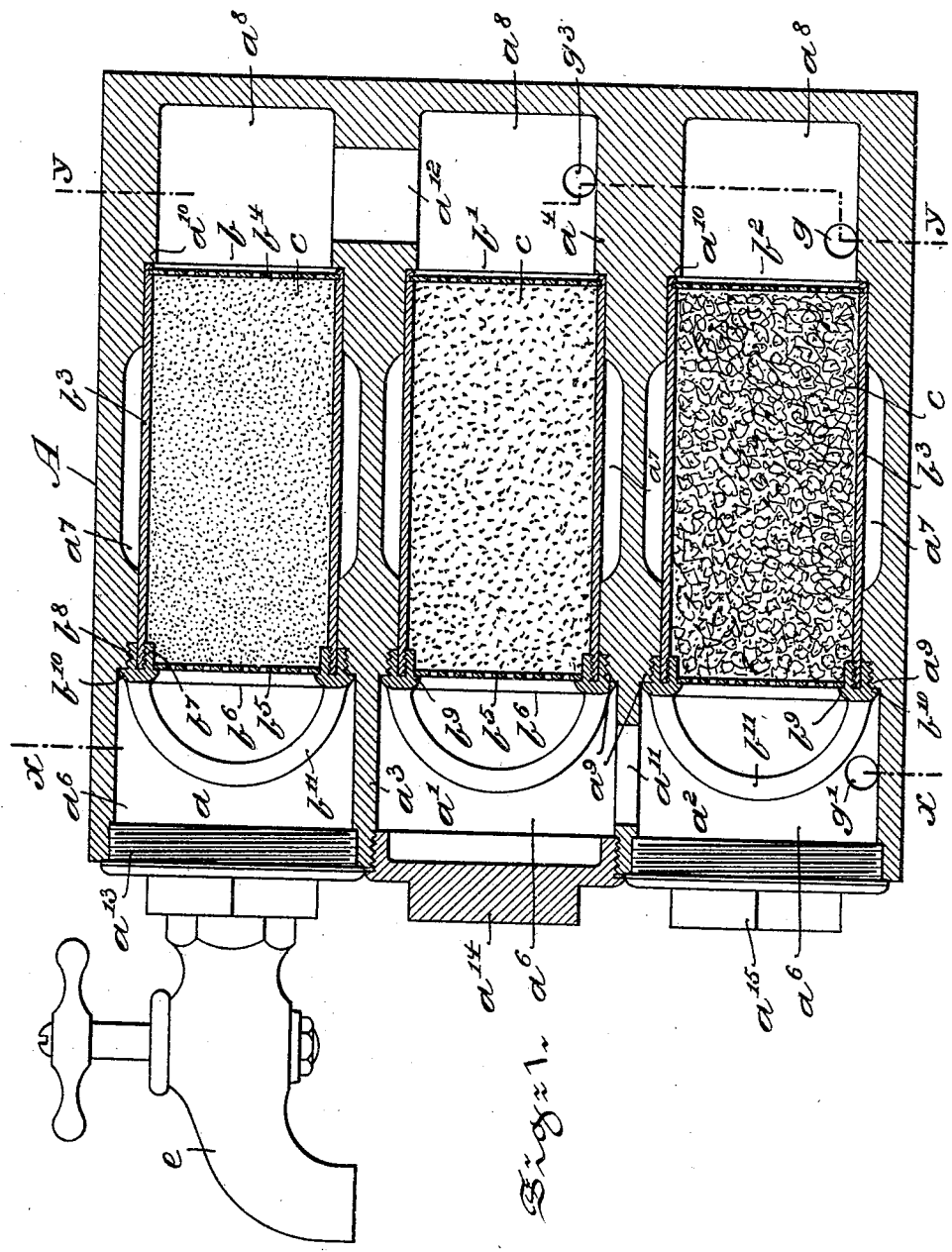

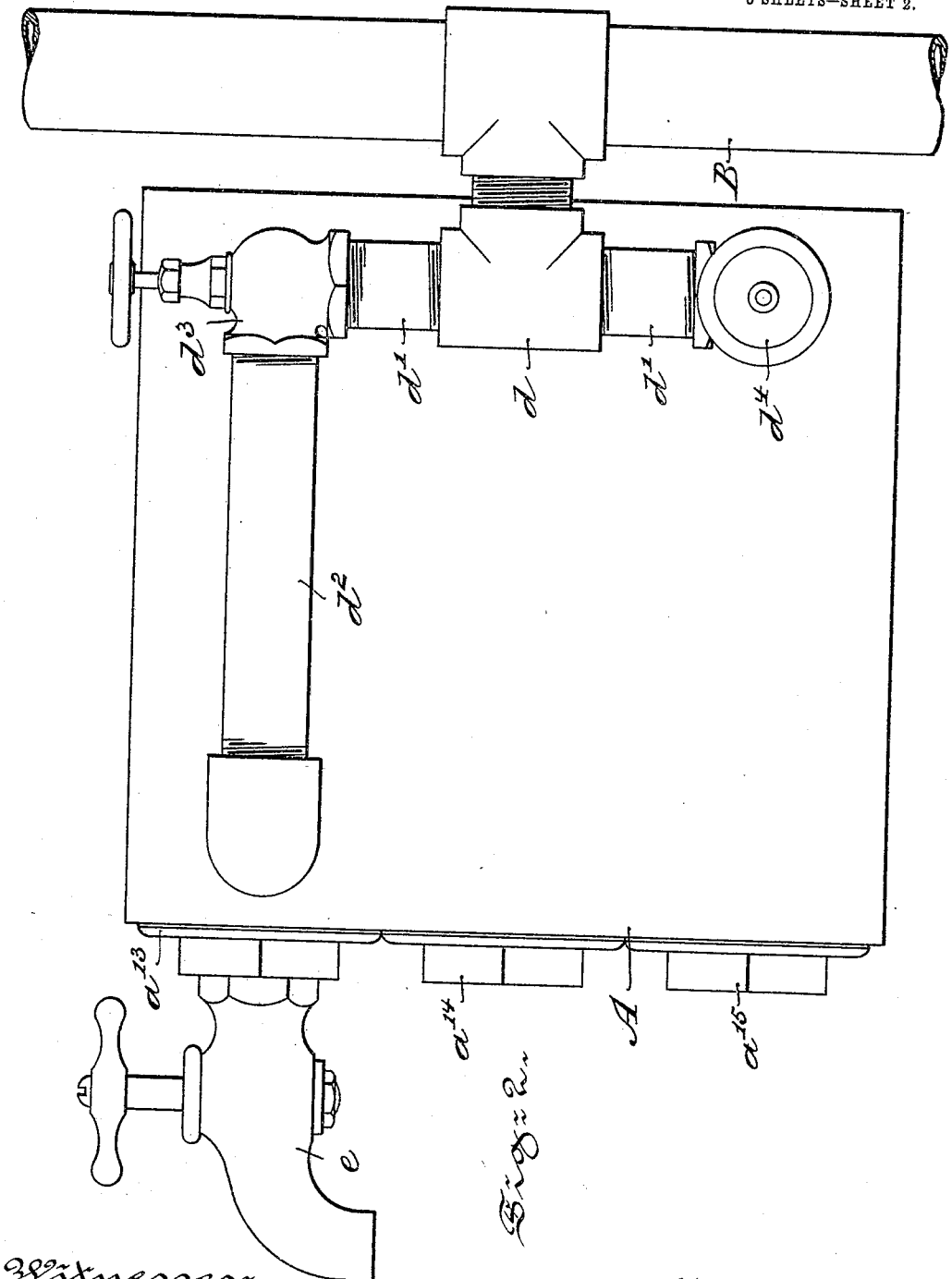

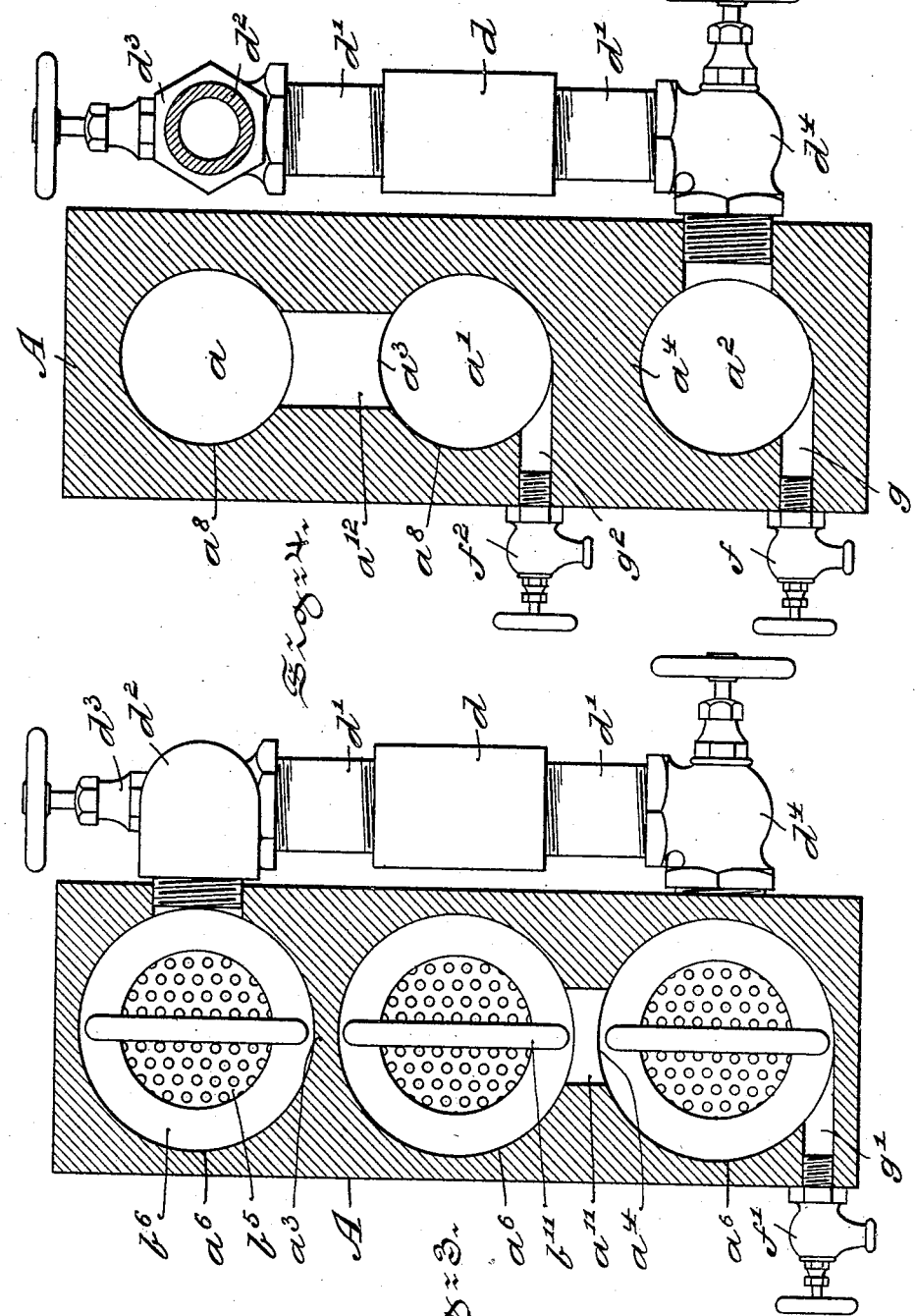

DANIEL M. PFAUTZ, OF GERMANTOWN, PENNSYLVANIA.

WATER-FILTER.

No. 813,517.  Specification of Letters Patent.  Patented Feb. 27, 1906.

Application filed May 12, 1905. Serial No. 260,085.

*To all whom it may concern:*

Be it known that I, DANIEL M. PFAUTZ, a citizen of the United States, residing at Germantown, in the county of Philadelphia and State of Pennsylvania, have invented certain new and useful Improvements in Water-Filters, of which the following is a specification.

My invention has relation to a portable apparatus for filtering water; and in such connection it relates to the construction and arrangement thereof.

The principal object of my present invention is to provide a comparatively simple and durable house or portable apparatus for filtering water effective in action for removing extraneous matter from the water and adapted to be readily cleansed as to the respective chambers of the filter suitably partitioned or separated from each other, yet at the same time in communication with each other for the passage of contaminated water therethrough for removal of foreign matter therefrom and the withdrawal of the same purified or filtered through the discharge thereof.

My invention stated in general terms consists of a portable filtering apparatus constructed and arranged in substantially the manner hereinafter described and claimed.

The nature and scope of my present invention will be more fully understood from the following description, taken in connection with the accompanying drawings, forming part hereof, in which—

Figure 1 is a vertical longitudinal central sectional view of a portable filtering apparatus embodying main features of my invention. Fig. 2 is a side elevational view thereof, and Figs. 3 and 4 are respectively vertical sectional views on the lines $xx$ and $yy$ of Fig. 1.

Referring to the drawings, A represents a rectangular or other shape casting forming a housing, which by means of partition-walls $a^3$ and $a^4$ is divided into superposed horizontal compartments $a$, $a'$, and $a^2$, the compartments being closed at one end by removable plugs $a^{13}$, $a^{14}$, and $a^{15}$. As shown in Fig. 1, each of the compartments $a$, $a'$, and $a^2$ is divided into three communicating sections or chambers $a^6$, $a^7$, and $a^8$ of gradually decreasing diameter and preferably circular in cross-section. The intermediate chambers $a^7$ of the compartments serve for the reception of the filter-beds $b$, $b'$, and $b^2$, in the present instance consisting of tubes or cylinders $b^3$, which in conjunction with perforated disks $b^4$ and $b^5$ at both ends of each of the tubes or cylinders form a receptacle for suitable filtering media $c$. The perforated disk $b^5$ of the filter-beds $b$, $b'$, and $b^2$ is removably secured thereto, so as to permit of the ready removal of the filtering media $c$ for cleansing or for the replacing of the same by other filtering media. One mode of securing the perforated disk $b^5$ to each of the tubes or cylinders $b^3$ consists of a ring $b^6$, provided with two annular projections $b^7$ and $b^8$, threaded on their outer surface, which projections form an annular recess, into which the threaded end of the cylinder $b^3$ is placed to form in conjunction therewith a fluid-tight joint. The threaded end of the cylinder $b^3$ by engaging the thread of the projection $b^7$ is securely and at the same time removably connected with the ring $b^6$. The disk $b^5$ bears with its perimeter against the inner annular projection $b^7$ and rests against a flange $b^9$ of the ring $b^6$. The threaded portion of the outer annular projection $b^8$ of the ring $b^6$ engages the threaded portion of a shoulder $a^9$, formed between the chambers $a^6$ and $a^7$, and the flange $b^{10}$ of the ring $b^6$ by bearing against the face of the shoulder $a^9$ forms a water-tight joint between the ring and shoulder. The above-described engagement of the ring $b^6$ with the shoulder $a^9$ and the threaded end of the cylinder $b^3$ serves the purpose of removably connecting the perforated disk $b^5$ to its cylinder $b^3$ and the cylinder to its chamber $a^7$ and also of forcing the free end of the cylinder $b^3$ against a shoulder or offset portion $a^{10}$, arranged between the chambers $a^7$ and $a^8$. In this manner a water-tight joint is established between each of the cylinders and their respective chambers. Each of the rings $b^6$ is provided with a bail-shaped handle $b^{11}$, which permits of the ready withdrawal of the ring $b^6$ when the same is unscrewed from its cylinder and shoulder $a^9$, for which purpose the plug closing the front chamber $a^6$ is first removed therefrom. The filter-bed disengaged from the shoulders $a^9$ and $a^{10}$ can now be removed from its chamber $a^7$ for the cleansing of the filtering media $c$ or for the replacing of the same by other filtering media.

The filtering media in the lowermost tube or cylinder may consist of porous fragmentary material, preferably Connellsville coke or carbon; in the next tube or cylinder of a mixture of coke, carbon, or the like and a porous material, such as pumice-stone, in relatively large fragments, but both as a mass of different densities from the material of the first tube or cylinder, while in the upper tube or cylinder adjacent to the discharge of the filtered water the filtering media may be of relatively small fragments of porous material, such as pumice-stone, and of a density differing from that of either of the other materials of the tubes or cylinders. The coke in large fragments not only permits the fluid to pass readily through the tube or cylinder, but by reason of the jagged irregular shape of the fragments stringy or slimy impurities and coloring-matter are caught and fastened in the materials of the tube or cylinder. The pumice-stone in the succeeding tube or cylinder possesses the peculiar property of absorbing and holding smaller debris and nitrogenous impurities, as well as coloring-matter, and the jagged edges of the fragments of pumice-stone also help to strain the fluid of stringy or hair-like impurities. Moreover, the use of coke and pumice-stone for filtering gives a filtering media which in a high degree is pure for such purpose by reason of being produced under a high heat.

The chambers $a^6$ and $a^8$, arranged in front and in the rear of each of the filter-beds, form superposed rows of chambers; in the present instance two of which on opposite ends of the filter-beds are alternately connected with each other by openings $a^{11}$ and $a^{12}$, arranged in the partition-walls $a^3$ and $a^4$. These chambers $a^6$ and $a^8$, in conjunction with the openings $a^{11}$ and $a^{12}$, serve to conduct water in a circuitous path and in opposite directions through the casting A, and the chambers in addition thereto serve as receptacles in which impurities of the water may be precipitated without in the least interfering with the proper operation of the filter-beds. As shown in Fig. 2, the casting A, by means of a T connection $d$, is removably secured to a water-supply pipe B. The connection $d$ is provided with two branch pipes $d'$ and $d^2$, which conduct water from the supply-pipe B either into the chamber $a^6$ of the upper compartment $a$ or into the chamber $a^8$ of the lower compartment $a^2$, for which purpose the branch pipe $d'$ is provided with valves $d^3$ and $d^4$, the valve $d^4$ of which directly engages the housing A, as shown in Fig. 4. If the valve $d^3$ is closed, the water from the supply-pipe B to be filtered is first conducted into the chamber $a^8$ of the lower compartment $a^2$, from which the same is conducted through the filter-bed $b^2$, containing the coarsest filtering media $c$. After the water has passed this filter-bed the same reaches the chamber $a^6$ of the compartmtnt $a^2$ and rising therein flows into the chamber $a^6$ of the second compartment $a'$ by passing through the opening $a^{11}$. From this chamber the water passes through the filter-bed $b'$ of this compartment $a'$, containing somewhat finer filtering media $c$, and by reaching the chamber $a^8$ of the same rises in this chamber and by passing the opening $a^{12}$ flows into the chamber $a^8$ of the upper compartment containing the filter-bed $b$, having the finest filtering media $c$. The water having finally reached the chamber $a^6$ of the upper compartment $a$ in a thoroughly purified condition is conducted from the same by means of a spigot $e$, preferably carried by the plug $a^{13}$, closing the upper compartment $a$. The chambers $a^6$ and $a^8$ of the lower compartment $a^2$ will receive the greatest amount of impurities carried by the water, but not removed by the lower filter-bed $b^2$. The lowermost chamber $a^6$ will also receive the impurities precipitated in the chamber $a^6$ of the intermediate compartment directly located above the same. If it is desired to remove the impurities of these chambers, as well as the superposed chambers $a^8$ of the intermediate and upper compartments $a'$ and $a$, valves $f$ and $f'$ of the chambers $a^8$ and $a^6$ of the compartments $a^2$ and a valve $f^2$ of the chamber $a^8$ of the intermediate compartment $a'$ are opened, and at the same time the spigot $e$ is closed. The water conducted directly into the chamber $a^8$ of the lower compartment will flush this chamber and will pass out of the same through the spigot $f$, while a portion of the water reaching the chambers $a^6$ of the lower and intermediate compartments $a^2$ and $a'$ and the chambers $a^8$ of the intermediate and upper compartments $a'$ and $a$, through their respective filter-beds, will flush these chambers and will pass out through the spigots $f'$ and $f^2$ by flowing through ducts $g$, $g'$, and $g^2$, respectively. On the other hand, when it is desired to clean the filter-beds, the valve $d^4$ is closed and the valve $d^3$ is opened. The water from the supply-pipe B flows into the chamber $a^6$ of the upper compartment $a$ and from the same passes through the intermediate and lower compartments $a'$ and $a^2$ and through their respective filter-beds in a reverse direction to that of the water to be filtered, and finally passes out of the casing A through the duct $g$ and spigot $f$ of the chamber $a^8$ of the lower compartment $a^2$. However, by the opening of all the spigots $f^2$, $f'$, and $f$ a portion of the water and the impurities removed from the upper and intermediate filter-beds may be removed before reaching the lowermost filter-bed in the compartment $a^2$. At the same time when the spigot $f^2$ is opened and the spigots $f'$ and $f$ are closed the uppermost filter is alone cleaned, since the water passes out of the chamber $a^8$ of the compartment $a'$. If the spigots $f^2$ and $f$ are closed and only the spigot $f'$ is opened, the water will pass through two filter-beds and leave the casting A through the chamber $a^6$ of the lower compartment $a^2$. When both the inlet-valves $d^3$ and $d^4$, as well as the spigots $f$, $f'$, and $f^2$ are opened, the flow of water will be divided, a portion of which passes into the lowermost chamber $a^8$ and will directly flush the same and the portion entering the uppermost chamber $a^6$ will pass through the filter $b$ and into both chambers $a^8$ of the uppermost compartment $a$ and intermediate compartment $a'$. In the chamber $a^8$ of this compartment, as well as in the chamber $a^8$ of the lowermost compartment $a^2$, the water will redivide, one portion flowing out of the spigots $f$ and $f^2$, respectively, whereas the remaining portions will flow toward each other and through the filter-beds $b'$ and $b^2$, uniting in the chamber $a^6$ of the lowermost compartment, and leaving the same through the spigot $f'$. When the water to be filtered contains any great amount of impurities and quickly renders the filter-beds inoperative, it is advisable to first clean the uppermost filter-bed, then both the uppermost and intermediate filter-beds, and thereafter all three filter-beds. This successive cleaning of the filter-beds prevents the impurities which have been removed from the upper and intermediate filter-beds being conducted into the lower filter-bed, which by being the first of the beds placed in the path of the water to be filtered naturally contains the greater amount of impurities. If, however, the amount of impurities carried by the water is comparatively small, all three filter-beds may be cleaned simultaneously.

Having thus described the nature and object of my invention, what I claim as new, and desire to secure by Letters Patent, is—

1. In a filter, a housing divided by partition-walls into a series of superposed compartments, each divided into three chambers, a receptacle containing filtering media removably mounted in the intermediate chamber of said chambers to form a row of superposed free chambers at each end of said receptacles, an opening in each of the partition-walls opposite to each other and adapted to connect two superposed or end chambers with each other and to form a passage-way from one compartment to the other, an inlet and an outlet for water at each end of said housing and in the last chamber of the lowermost and in the first chamber of the uppermost compartment, said inlets and outlets adapted to reverse the flow of water through said filter-receptacles and the rows of superposed chambers, and said openings in said partition-walls, in conjunction with said chambers, adapted to permit of the alternate passing of water from opposite sides through said filter-receptacles within said housing.

2. In a filter, a housing divided by partition-walls into a series of superposed compartments, each divided into three chambers, receptacles containing filtering media removably mounted in the intermediate chamber of said chambers to form a row of superposed free chambers at each end of said receptacles, an opening in each of the partition-walls opposite to each other and adapted to connect two superposed or end chambers with each other to permit sediment precipitated to accumulate in one of said directly-connected chambers and to form a passage-way from one compartment to the other, an inlet and an outlet for water at each end of said housing and in the last chamber of the lowermost and in the first chamber of the uppermost compartment, the inlet of one chamber and the outlet of the other of said chambers adapted when alternately opened to reverse the flow of water through said filter-receptacles and said chambers, and said openings in said partition-walls in conjunction with said chambers adapted to permit of the alternate passing of water from opposite sides through said filter-receptacles within said housing.

3. In a filter, a housing divided by partition-walls into a series of superposed compartments, each divided into three chambers, a receptacle containing filtering media removably mounted in the intermediate chamber of said chambers to form a row of superposed free chambers for the accumulation of sediment at each end of said receptacles, an opening in each of the partition-walls opposite to each other therein and adapted to connect two superposed or end chambers with each other to permit the sediment precipitated to accumulate in the lowermost one of said directly-connected chambers and to form a passage-way from one compartment to the other, an inlet and an outlet for water to be filtered at each end of said housing and in the last chamber of the lowermost chamber and in the first chamber of the uppermost compartment, the inlet of one chamber and outlet of the other of said chambers adapted when alternately opened to reverse the flow of water through said chambers within said housing and said openings in said partition-walls adapted to permit of the alternate passing of water from opposite sides through said filter-receptacles, and outlets for water arranged in each of the lower chambers of the connected chambers adapted to permit of the removal of the sediment therefrom.

4. In a filter, a housing divided by partition-walls into a series of superposed compartments, each divided into three chambers, tubes or cylinders closed at each end by a perforated disk holding filtering media in position therein and removably mounted in the intermediate chamber of said chambers to form a row of superposed free chambers for the accumulation of sediment at each end of said cylinders, an opening arranged in each of the partition-walls opposite each other and adapted to connect two superposed or end chambers with each other to permit the sediment precipitated therein to accumulate in the lower chamber of said directly-connected chambers and to form a passage-way from one compartment to the other, an inlet for water arranged in the last chamber of the lowermost and in the first chamber of the uppermost compartments respectively, and outlets for water arranged in each of the lower chambers of the connected chambers, said inlets and outlets for water adapted, when opened, to permit of the flow of water from opposite ends within said housing and of the removal therefrom of sediment from the lower chamber of each of the connected chambers.

5. In a filter, a housing divided by partition-walls into a series of superposed compartments, each divided into three chambers, tubes or cylinders closed at each end by a perforated disk holding filtering media in position therein and removably mounted in the intermediate chamber of said chambers to form a row of superposed free chambers for the accumulation of sediment at each end of said cylinders, an opening in each of the partition-walls opposite each other and adapted to directly connect two end chambers with each other to permit sediment precipitated to accumulate in the lower chamber of said connected chambers and to form in conjunction with said chambers a passage-way from one compartment to the other, an inlet and an outlet for water at each end of said housing and in the last chamber of the lowermost and in the first chamber of the uppermost compartments respectively, and an outlet for water in each of the lower chambers of the directly-connected superposed chambers, said inlets and outlets with the exception of the outlet of the first uppermost chamber adapted, when opened, to permit of the direct cleaning of the last of the lowermost chambers forming normally the entrance-chamber for water to be filtered containing the greatest amount of impurities and of the cleaning of the filter-beds and removal of precipitated impurities from the lower chambers of the connected superposed chambers by dividing the water entering the casing from opposite ends and flowing in opposite directions toward each other and permitting of the redivision of both portions so as to permit one portion to pass through the outlets of these chambers without passing through the filter-beds and of the other portion passing therethrough to reach said outlets.

6. A filter, consisting of a casting divided by partition-walls into a series of superposed compartments, each divided into three chambers, tubes or cylinders containing filtering media mounted in the intermediate chambers of said compartments, each of said intermediate chambers having a threaded portion at one end, a ring arranged at the threaded end of each of said cylinders having two threaded projections, the inner one adapted to receive the threaded end of a cylinder and the outer one adapted to connect the same with said intermediate chamber by engaging the threaded portion thereof.

7. A filter, consisting of a casting divided by partition-walls into a series of superposed compartments, each divided into three chambers, two of said chambers forming a shoulder between the same, tubes or cylinders containing filtering media mounted in the intermediate chambers of said compartments, each of said intermediate chambers having a threaded portion at one end, a ring arranged at the threaded end of each of said cylinders having two threaded projections forming an annular chamber and flanges projecting beyond said projections, a disk adapted to close the threaded end of a cylinder and to be held in position therein by the inner of said flanges, said inner threaded projection adapted to engage the threaded end of the cylinder and the outer threaded projection adapted to connect the cylinder with the intermediate chamber by engaging its threaded portion and the outer flange adapted to render the connection water-tight by engaging the shoulder formed between the first and intermediate chambers respectively of said compartments.

8. A filter, consisting of a casting divided by partition-walls into a series of superposed compartments, each divided into three chambers, two of said chambers forming a shoulder between the same, tubes or cylinders containing filtering media mounted in the intermediate chambers of said compartments, each of said intermediate chambers having a threaded portion at one end, a ring arranged at the threaded end of each of said cylinders having two threaded projections forming an annular chamber and flanges extending beyond said projections, a disk adapted to close the threaded end of the cylinder and to be held in position therein by the inner of said flanges, said inner threaded projection adapted to engage the threaded end of the cylinder and the outer threaded projection adapted to connect the cylinder with the intermediate chamber by engaging its threaded portion and the outer flange adapted to render this connection water-tight by engaging the shoulder formed between the first and intermediate chambers of said compartments, and a handle connected with each of said rings and adapted to permit of the disconnection of the filter-tube from its chamber to remove the same therefrom.

In testimony whereof I have hereunto set my signature in the presence of two subscribing witnesses.

DANIEL M. PFAUTZ.

Witnesses:
J. WALTER DOUGLASS,
THOMAS M. SMITH.